US008628293B2

(12) United States Patent
Ramachandran et al.

(10) Patent No.: US 8,628,293 B2
(45) Date of Patent: Jan. 14, 2014

(54) GAS TURBINE ENGINE COMPONENTS WITH COOLING HOLE TRENCHES

(75) Inventors: Dhinagaran Ramachandran, Karnataka (IN); Gopal Samy Muthiah, Tamil Nadu (IN); Jyothishkumar Venkataramanan, Tamil Nadu (IN); Balamurugan Srinivasan, Karnataka (IN); Jong Liu, Scottsdale, AZ (US); Luis Tapia, Maricopa, AZ (US); Daniel Cregg Crites, Mesa, AZ (US); Malak Fouad Malak, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 692 days.

(21) Appl. No.: 12/818,018

(22) Filed: Jun. 17, 2010

(65) Prior Publication Data

US 2011/0311369 A1 Dec. 22, 2011

(51) Int. Cl.
*F01D 5/08* (2006.01)
(52) U.S. Cl.
USPC ........................................ 415/115; 416/97 R
(58) Field of Classification Search
USPC ........................................ 416/97 R; 415/115
See application file for complete search history.

(56) References Cited

U.S. PATENT DOCUMENTS

| 4,461,612 A | 7/1984 | Dodd |
| 4,526,358 A | 7/1985 | Ura et al. |
| 4,529,358 A * | 7/1985 | Papell ......................... 416/97 A |
| 4,653,983 A | 3/1987 | Vehr |
| 4,664,597 A | 5/1987 | Auxier et al. |
| 5,062,768 A | 11/1991 | Marriage |
| 5,096,379 A | 3/1992 | Stroud et al. |
| 5,261,223 A | 11/1993 | Foltz |
| 5,281,084 A | 1/1994 | Noe et al. |
| 5,382,133 A | 1/1995 | Moore et al. |
| 5,465,572 A | 11/1995 | Nicoll et al. |
| 5,496,151 A | 3/1996 | Coudray et al. |
| 5,511,937 A | 4/1996 | Papageorgiou |
| 5,609,779 A * | 3/1997 | Crow et al. .............. 219/121.71 |
| 5,683,600 A | 11/1997 | Kelley et al. |
| 5,747,769 A | 5/1998 | Rockstroh et al. |
| 6,243,948 B1 | 6/2001 | Lee et al. |
| 6,329,015 B1 | 12/2001 | Fehrenbach et al. |

(Continued)

FOREIGN PATENT DOCUMENTS

| EP | 0924384 A2 | 6/1999 |
| EP | 0992653 A1 | 4/2000 |

(Continued)

OTHER PUBLICATIONS

Malak, F.M., et al.; Gas Turbine Engine Components With Film Cooling Holes Having Cylindrical to Multi-Lobe Configurations, U.S. Appl. No. 13/465,647, filed May 7, 2012.

(Continued)

*Primary Examiner* — Edward Look
*Assistant Examiner* — Juan G Flores
(74) *Attorney, Agent, or Firm* — Ingrassia Fisher & Lorenz, P.C.

(57) ABSTRACT

An engine component includes a body having an interior surface and an exterior surface; a cooling hole formed in the body and extending from the interior surface to the exterior surface; and a concave trench extending from the cooling hole at the exterior surface of the body in a downstream direction.

6 Claims, 7 Drawing Sheets

(56) References Cited

U.S. PATENT DOCUMENTS

| | | | |
|---|---|---|---|
| 6,368,060 | B1 | 4/2002 | Fehrenbach et al. |
| 6,420,677 | B1 | 7/2002 | Emer et al. |
| 6,554,571 | B1 | 4/2003 | Lee et al. |
| 6,607,355 | B2 | 8/2003 | Cunha et al. |
| 6,616,406 | B2 | 9/2003 | Liang |
| 6,979,176 | B2 | 12/2005 | Nakamata et al. |
| 6,984,100 | B2 | 1/2006 | Bunker et al. |
| 7,008,186 | B2 | 3/2006 | Heeg et al. |
| 7,131,814 | B2 | 11/2006 | Nagler et al. |
| 7,186,085 | B2 | 3/2007 | Lee |
| 7,186,091 | B2 | 3/2007 | Lee et al. |
| 7,246,992 | B2 | 7/2007 | Lee |
| 7,249,933 | B2 | 7/2007 | Lee et al. |
| 7,328,580 | B2 | 2/2008 | Lee et al. |
| 7,351,036 | B2 | 4/2008 | Liang |
| 7,374,401 | B2 | 5/2008 | Lee |
| 7,540,712 | B1 | 6/2009 | Liang |
| 7,597,540 | B1 * | 10/2009 | Liang .......................... 416/97 R |
| 7,997,867 | B1 * | 8/2011 | Shih et al. ................... 416/97 R |
| 7,997,868 | B1 | 8/2011 | Liang |
| 8,057,179 | B1 | 11/2011 | Liang |
| 8,057,180 | B1 | 11/2011 | Liang |
| 8,057,181 | B1 | 11/2011 | Liang |
| 2005/0023249 | A1 | 2/2005 | Kildea |
| 2005/0135931 | A1 | 6/2005 | Nakamata et al. |
| 2005/0232768 | A1 | 10/2005 | Heeg et al. |
| 2006/0104807 | A1 | 5/2006 | Lee |
| 2006/0171807 | A1 | 8/2006 | Lee |
| 2006/0272335 | A1 | 12/2006 | Schumacher et al. |
| 2006/0277921 | A1 | 12/2006 | Patel et al. |
| 2007/0006588 | A1 | 1/2007 | Patel et al. |
| 2007/0128029 | A1 | 6/2007 | Liang |
| 2007/0234727 | A1 | 10/2007 | Patel et al. |
| 2008/0003096 | A1 | 1/2008 | Kohli et al. |
| 2008/0005903 | A1 | 1/2008 | Trindade et al. |
| 2008/0031738 | A1 | 2/2008 | Lee |
| 2008/0271457 | A1 | 11/2008 | McMasters et al. |
| 2009/0246011 | A1 | 10/2009 | Itzel |
| 2010/0040459 | A1 | 2/2010 | Ohkita |
| 2010/0124484 | A1 | 5/2010 | Tibbott et al. |
| 2010/0303635 | A1 | 12/2010 | Townes et al. |
| 2011/0097188 | A1 | 4/2011 | Bunker |
| 2011/0176929 | A1 * | 7/2011 | Ammann et al. ........... 416/97 R |
| 2011/0217181 | A1 | 9/2011 | Hada et al. |
| 2011/0268584 | A1 | 11/2011 | Mittendorf |

FOREIGN PATENT DOCUMENTS

| | | | | |
|---|---|---|---|---|
| EP | 1892375 | A1 | 2/2008 | |
| EP | 1942251 | A2 | 7/2008 | |
| EP | 1970628 | A2 | 9/2008 | |
| JP | 07332005 | | 12/1995 | |
| JP | 2001012204 | | 1/2001 | |
| JP | 2001012204 | A * | 1/2001 | ................ F01D 5/18 |
| JP | 2006307842 | | 11/2006 | |

OTHER PUBLICATIONS

Kusterer et al., Double-Jet Film-Cooling for Highly Efficient Film-Cooling with Low Blowing Ratios, Proceedings of ASME Turbo Expo 2008: Power for Land, Sea and Air GT2008, Jun. 9-13, 2008, pp. 1-12, Berlin, Germany, GT2008-50073.

Wayne et al., High-Resolution Film Cooling Effectiveness Comparison of Axial and Compound Angle Holes on the Suction Side of a Turbine Vane, Transactions of the ASME, pp. 202-211, Copyright 2007 by ASME.

Lu et al., Turbine Blade Showerhead Film Cooling: Influence of Hole Angle and Shaping, International Journal of Heat and Fluid Flow 28 (2007) pp. 922-931.

Kim et al., Influence of Shaped Injection Holes on Turbine Blade Leading Edge Film Cooling, International Journal of Heat and Mass Transfer 47 (2004) pp. 245-256.

Ramachandran et al., Turbine Engine Components, filed with the USPTO on Jun. 24, 2009 and assigned U.S. Appl. No. 12/490,840.

Venkataramanan et al., Gas Turbine Engine Components With Improved Film Cooling, filed with the USPTO on Nov. 25, 2009 and assigned U.S. Appl. No. 12/625,854.

Loh, Teck Seng; Srigrarom, Sutthiphong; Investigative Study of Heat Transfer and Blades Cooling in the Gas Turbine, The Smithsonian/NASA Astrophysics Data System; Modern Physics Letters B, vol. 19, Issue 28-29, pp. 1611-1614 (2005).

Loh, Teck Seng; Srigrarom, Sutthiphong; Investigative Study of Heat Transfer and Blades Cooling in the Gas Turbine, Modern Physics Letters B, vol. 19, Issue 28-29, pp. 1611-1614 (2005).

Ronald S. Bunker; A Review of Shaped Hole Turbine Film-Cooling Technology; Journal of Heat Transfer, Apr. 2005, vol. 127, Issue 4, 441 (13 pages).

Shih, T. I.-P., Na, S.; Momentum-Preserving Shaped Holes for Film Cooling; ASME Conference Proceedings, Year 2007, ASME Turbo Expo 2007: Power for Land, Sea, and Air (GT2007), May 14-17, 2007, Montreal, Canada; vol. 4: Turbo Expo 2007, Parts A and B; Paper No. GT2007-27600, pp. 1377-1382.

Yiping Lu; Effect of Hole Configurations on Film Cooling From Cylindrical Inclined Holes for the Application to Gas Turbine Blades, A Dissertation, Submitted to the Graduate Faculty of the Louisiana State University and Agricultural and Mechanical College, Dec. 2007.

Colban, W., Thole, K.; Influence of Hole Shape on the Performance of a Turbine Vane Endwall Film-cooling Scheme, International Journal of Heat and Fluid Flow 28 (2007), pp. 341-356.

Gartshore, I., Salcudean, M., Hassan, I.: Film Cooling Injection Hole Geometry : Hole Shape Comparison for Compound Cooling Orientation, American Institute of Aeronautics and Astronautics, Reston, VA, 2001, vol. 39, No. 8, pp. 1493-1499.

Okita, Y., Nishiura, M.: Film Effectiveness Performance of an Arrowhead-Shaped Film Cooling Hole Geometry, ASME Conference Proceedings, ASME Turbo Expo 2006: Power for Land, Sea, and Air (GT2006), May 8-11, 2006 , Barcelona, Spain, vol. 3: Heat Transfer, Parts A and B, No. GT2006-90108, pp. 103-116.

Lu, Y., Allison, D., Ekkad, S. V.: Influence of Hole Angle and Shaping on Leading Edge Showerhead Film Cooling, ASME Turbo Expo 2006: Power for Land, Sea, and Air (GT2006), May 8-11, 2006 , Barcelona, Spain, vol. 3: Heat Transfer, Parts A and B, No. GT2006-90370 pp. 375-382.

Heidmann et al., A Novel Antivortex Turbine Film-Cooling Hole Concept, Journal of Turbomachinery, 2008 by ASME, Jul. 2008, vol. 130, pp. 031020-1-031020-9.

EP Search Report, EP10187079.8-2321 dated Apr. 2, 2011.

* cited by examiner

US 8,628,293 B2

GAS TURBINE ENGINE COMPONENTS WITH COOLING HOLE TRENCHES

TECHNICAL FIELD

The present invention generally relates to gas turbine engines, and more particularly relates to air cooled components of gas turbine engines, such as turbine and combustor components.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path, in order to prevent overheating and potential mechanical issues attributable thereto. As such, it is desirable to cool the rotor blades and stator vanes in order to prevent damage and extend useful life. One mechanism for cooling turbine airfoils is to duct cooling air through internal passages and then vent the cooling air through holes formed in the airfoil. The holes are typically formed uniformly along a line substantially parallel to the leading edge of the airfoil and at selected distances from the leading edge to provide a film of cooling air over the convex side of the airfoil when the cooling air flows therethrough during engine operation. Other rows of cooling holes or an array of holes may be formed in the airfoil components depending upon design constraints. Film cooling attempts to maintain the airfoils at temperatures that are suitable for their material and stress level.

A typical film cooling hole is a cylindrical aperture inclined relative to the surface of the airfoil. In many conventional engines, however relatively high disadvantageous cooling air flows have been used to obtain satisfactory temperature control of engine components.

Accordingly, it is desirable to provide a gas turbine engine with improved film cooling. In addition, it is desirable to provide a air-cooled turbine components with improved hole configurations. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an engine component includes a body having an interior surface and an exterior surface; a cooling hole formed in the body and extending from the interior surface to the exterior surface; and a concave trench extending from the cooling hole at the exterior surface of the body in a downstream direction.

In accordance with another exemplary embodiment, an engine component includes a body having an interior surface and an exterior surface; a cooling hole formed in the body and extending from the interior surface to the exterior surface; and a concave trench extending from the cooling hole at the exterior surface of the body in a downstream direction. The concave trench includes a leading edge with a first convex portion, a concave portion, and a second convex portion, and the first convex portion transitions into the concave portion and the concave portion transitions into the second convex portion.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved film cooling. The turbine components have a number of circular or non-circular cooling holes. The cooling holes may have, for example, both convex and concave portions. For example, the cooling holes can have cross-sectional shapes such as: oval, bean-shaped, triad-shaped, reverse B-shaped, dumbbell shaped, and/or triangle-shaped. Additionally, the cooling holes have a trench at the surface of the turbine component that extends in a downstream direction to improve film cooling.

Figure 1:
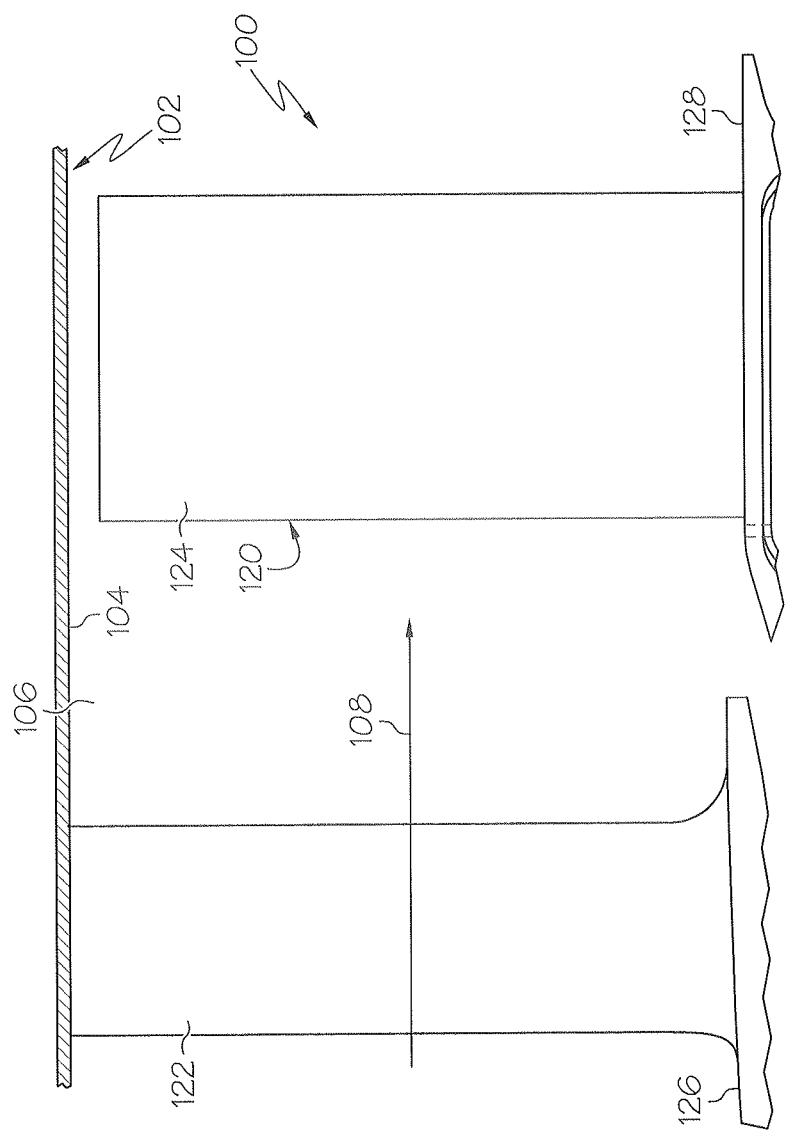
FIG. 1 is a partial, sectional elevation view illustrating a portion of a turbine section of a gas turbine engine in accordance with an exemplary embodiment.

FIG. 1 is a partial sectional elevation view illustrating a portion of a turbine section 100 of a gas turbine engine formed in accordance with an exemplary embodiment. The turbine section 100 and gas turbine engine in general have an overall construction and operation that is understood by persons skilled in the art. In general terms, the turbine section 100 has a housing 102 with an annular duct wall 104 that defines a mainstream hot gas flow path 106 for receiving mainstream gas flow 108 from an engine combustor (not shown). The mainstream hot gas flow 108 flows past axially spaced circumferential rows of airfoils 120, which include stator vanes 122 and rotor blades 124 formed from suitable materials capable of withstanding the high temperature environment within the mainstream hot gas flow path 106.

The stator vanes 122 project radially outwardly from a circumferential platform 126 to the annular duct wall 104. The rotor blades 124 project radially outwardly from a circumferential platform 128 that is adapted for appropriate connection to the rotor disk (not shown) at the periphery thereof. The rotor disk is generally positioned within the internal engine cavity and is coupled to a main engine shaft for rotation therewith. As shown, the rotor blade 124 and stator vane 122 may form one stage of a multistage turbine. As such, multiple rows of the stator vanes 122 and the rotor blades 124 may be provided in the turbine section 100, with the rotor blades 124 and associated rotor disks being rotatably driven by the hot gas flow 108 for power extraction. A supply of cooling air, typically obtained as a bleed flow from the compressor (not shown), may pass through cooling holes in the stator vane 122 and rotor blade 124 to form a surface cooling film. Although the cooling holes are discussed with reference to turbine components, the cooling holes may also be incorporated into other engine components, such as combustor components. The cooling holes are discussed in greater detail below.

Figure 2:
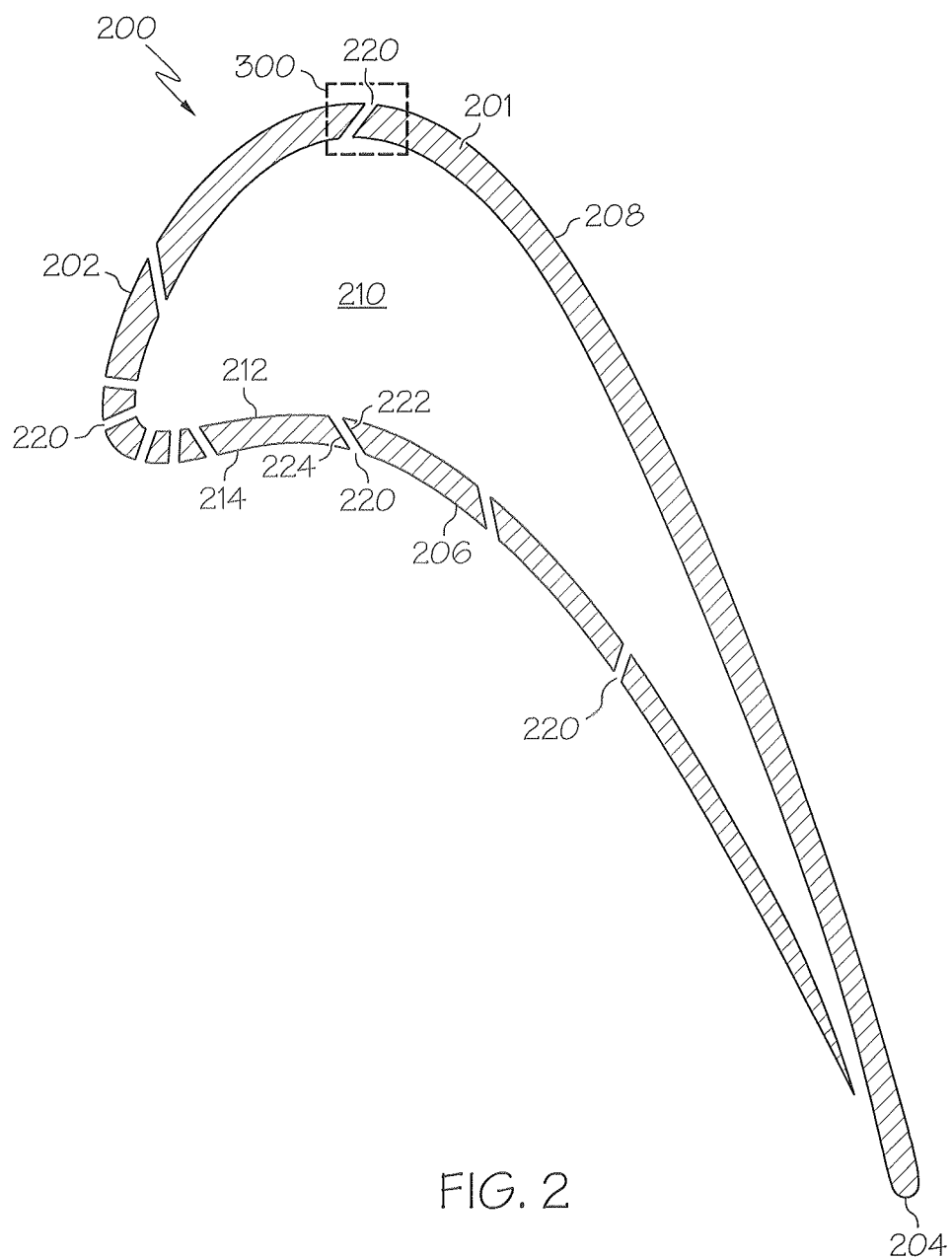
FIG. 2 is a top cross-sectional view of an airfoil that may be incorporated into the turbine section of FIG. 1 in accordance with an exemplary embodiment.

FIG. 2 is a top cross-sectional view of an airfoil 200 that can be incorporated into the turbine section 100 of FIG. 1 in accordance with an exemplary embodiment. In general, the airfoil 200 may correspond to the stator vane 122 or rotor blade 124 of FIG. 1, and the cross-sectional view of FIG. 2 generally corresponds to a horizontal cross-sectional view from the perspective of FIG. 1.

The airfoil 200 generally has a body 201 with a leading edge 202 and an opposite trailing edge 204. The airfoil 200 also includes a pressure sidewall 206 that is generally concave and an opposite, suction sidewall 208 that is generally convex and is spaced-apart from the pressure sidewall 206. The pressure sidewall 206 and suction sidewall 208 extend from leading edge 202 to trailing edge 204. The airfoil 200 has a hollow interior cavity 210 such that the airfoil 200 has an inner surface 212 and an outer surface 214. Airfoils 200 used in high performance gas turbine engines, such as those used for aircraft propulsion, can be made from high heat and high stress resistant aerospace alloys, such as nickel based alloys, Rene 88, Inconel 718, single crystal materials, steels, titanium alloys or the like.

As noted above, the airfoil 200 is subject to high temperatures because high velocity hot gases are ducted from the combustor (not shown) onto the airfoil 200. If unaddressed, the extreme heat may affect the useful life of an airfoil. As such, film cooling is provided for the airfoil 200 to provide a cooling film of fluid onto the surface of the airfoil 200, particularly in the area of the leading edge 202 and areas immediately aft of the leading edge 202. As noted above, cooling air is bled from the compressor (not shown) or other source and passes into the interior cavity 210 and through cooling holes 220 to the outer surface 214 of the airfoil 200. The cooling holes 220 are formed at locations on the airfoil 200, particularly the pressure sidewall 206, suction sidewall 208, and leading edge 202, to provide optimum cooling of the engine component.

The cooling holes 220 may be formed in a selected pattern or array to provide optimum cooling. The cooling holes 220 may be disposed at any angle relative to the outer surface, such as about 20° to about 40°, although the cooling holes 220 may be oriented at lesser or greater angles. Computational fluid dynamic (CFD) analysis can additionally be used to optimize the location and orientation of the cooling holes 220. The cooling holes 220 may be formed by casting, abrasive water jet, Electron Discharge Machining (EDM), laser drilling, or any suitable process.

In general, the cooling holes 220 may be considered to have an upstream portion 222 adjacent the inner surface 212 and a downstream portion 224 adjacent the outer surface 214. The upstream portion of each cooling hole 220, lying closer to the inner surface 212, is substantially cylindrical or circular, and the downstream portion lying closer to the outer surface 214 may have a cross-sectional shape as discussed below with reference to FIGS. 3-13, particularly at the outer surface 214. The performance of the airfoil 200 may be directly related to the ability to provide uniform cooling of its surfaces with a limited amount of cooling air. In particular, the size and shape of each hole 220 determine the distribution of the air flow across the downstream surface. Consequently, the cooling holes 220, particularly their cross-sectional and surface configurations, are important design considerations.

Figure 3:
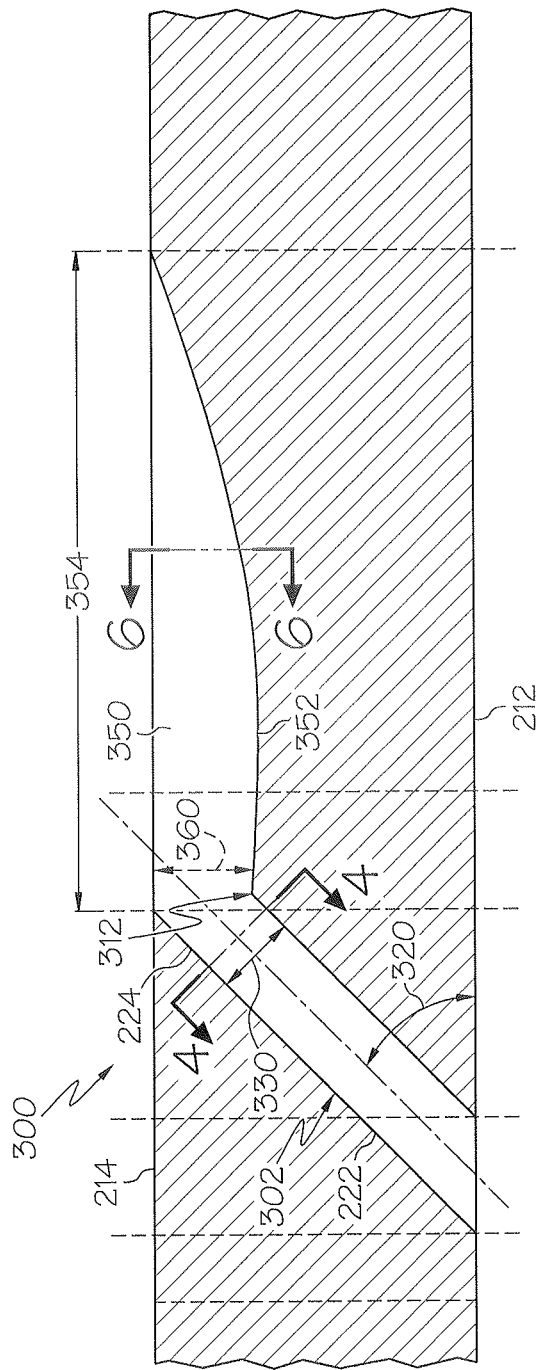
FIG. 3 is a more detailed view of a section of the airfoil of FIG. 2 in accordance with an exemplary embodiment.
Figure 4:
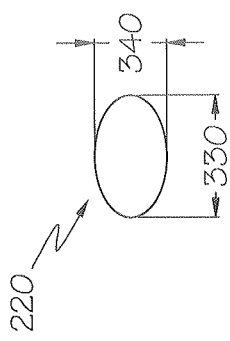
FIG. 4 is a cross-sectional view of the cooling hole through line 4-4 of FIG. 3 in accordance with an exemplary embodiment.
Figure 5:
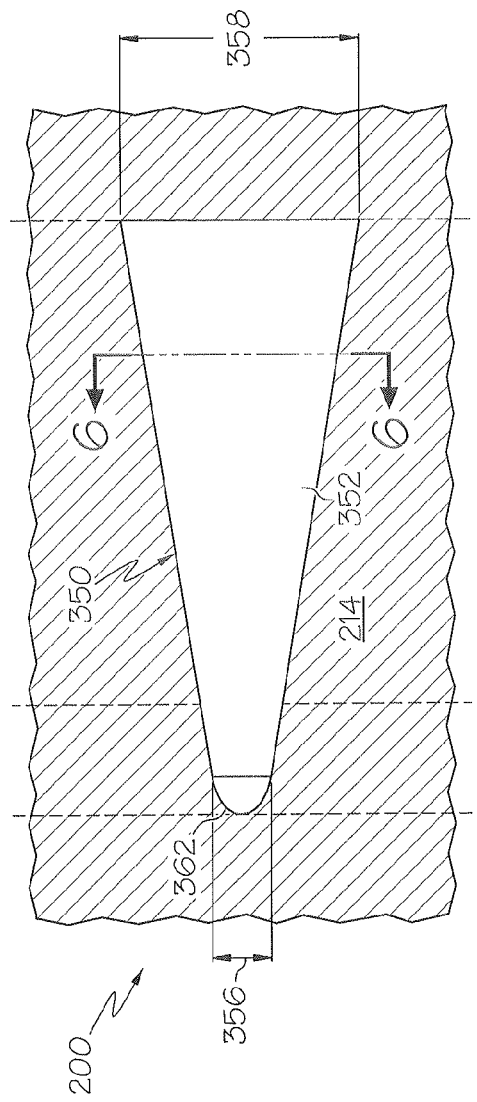
FIG. 5 is a top view of the cooling hole of FIG. 3 in accordance with an exemplary embodiment.
Figure 6:
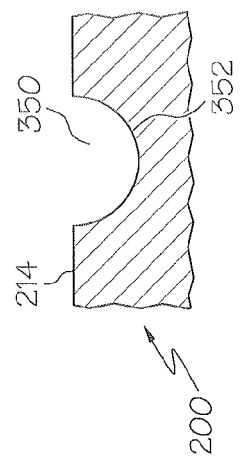
FIG. 6 is a cross-sectional view of the cooling hole through line 6-6 of FIG. 3 in accordance with an exemplary embodiment.

FIG. 3 is a more detailed view of a section 300 of the airfoil 200 of FIG. 2 in accordance with an exemplary embodiment. In particular, FIG. 3 is a cross-sectional view of one of the cooling holes 220. FIGS. 4-6 are additional views of the cooling hole 220 in accordance with an exemplary embodiment. In particular, FIG. 4 is a cross-sectional view of the cooling hole 220 through line 4-4 of FIG. 3 in accordance with an exemplary embodiment, and FIG. 5 is a top or outer surface view of the cooling hole 220 of FIG. 3 in accordance with an exemplary embodiment. FIG. 6 is a cross-sectional view of the cooling hole 220 through line 6-6 of FIGS. 3 and 5. The cooling hole 220 will now be described in greater detail with reference to FIGS. 3-6.

As noted above and best shown in FIG. 3, the cooling holes 220 may be considered to have an interior or upstream portion 222 adjacent the inner surface 212 and a downstream portion 224 adjacent the outer surface 214. The cooling hole 220 is oriented relative to the inner and outer surfaces 212, 214 at an angle 320. The angle 320 may be, for example, about 35°, although any suitable angle may be selected.

The downstream portion 312 of each cooling hole 220 is at least partially defined by a trench 350. In general, the trench 350 provides improved film cooling at the surface 214 of the airfoil 200. The trench 350 enables the cooling air to remain attached to the surface 214 for a longer period of time and minimizes mixing of the cooling air and mainstream gas flow, thereby resulting in a more uniform film. Relative to conventional arrangements, the trench 350 reduces the radial velocity (i.e., perpendicular to the surface 214) of the cooling air as it exits the cooling hole 220 to prevent surface separation.

The trench 350 is defined in the outer surface 214 by a concave bottom wall 352 and extends in a downstream direction relative to the main gas flow to a length 354. The length 354 may be a function of a diameter 330 of the cooling hole

220. For example, the length 354 may be at least four times greater than the length 330. The length 354, may be, for example, six times the diameter (length 330 or width 340) of the hole; but it could be smaller or larger depending on the pitch of the holes.

The trench 350 may have a first depth 360 at an upstream end that corresponds to the maximum depth of the trench 350, although in other embodiments, the maximum depth may be further downstream. In some exemplary embodiments, the depth 360 may be a function of a diameter 330 of the cooling hole 220. As an example, the depth 360 may be approximately equal to the diameter 330. In other embodiments, the depth 360 may be based on other criteria.

As most clearly shown in FIG. 4, the downstream portion 224 of each cooling hole 220 is substantially oval. The downstream portion 224 has a cross-sectional diameter (or length) 330 along the major axis of the oval shape that is generally parallel to the mainstream gas flow and a cross-sectional diameter (or width) 340 along the minor axis of the oval shape. In other embodiments, the cooling hole 220 may be circular or elliptical.

As most clearly shown in the top view of FIG. 5, the leading edge 362 of the trench 350 is the same cross-sectional shape as the downstream portion 224. In other words, the leading edge 362 of the trench 350 and the leading edge of the cooling hole 220 may be coincident. As such, in the exemplary embodiment of FIG. 5, the leading edge 362 is oval shaped. As also shown in FIG. 5, the trench 350 transitions from a first width 356 that generally corresponds to the cross-sectional diameter 340 of the downstream portion 224 to a second, maximum width 358 at the downstream end. In the depicted embodiment, the trench 350 transitions from the first width 356 to the second width 358 in a constant manner such that the trench 350 has a generally fan shape as viewed from a top view such as shown in FIG. 5. The maximum width 358 may be, for example, 4 times the diameter; however this is a function of the space between two rows and also the pitch of the holes.

FIG. 6 is a cross-sectional view of the cooling hole 220 through line 6-6 of FIGS. 3 and 5. In particular, FIG. 6 illustrates the bottom wall 352 that forms the trench 350 in the surface 214 of the airfoil 200. As shown in the depicted embodiment, the wall 352 forms the entire trench 350. However, in other embodiment, additional walls may be used, including straight and curved portions.

Although not shown, the interior portion 302 may have other cross-sectional shapes in positions further upstream to the view of FIG. 3, i.e., in positions closer to the inner surface 212. For example, these cross-sectional shapes may be circular or cylindrical and transition into the cross-sectional shape shown in FIG. 4. Additionally, the length 330 and width 340 of the cooling holes 220 may vary. For example, the length 330 and width 340 may increase as the cooling hole 220 approaches the exterior surface 214 and the trench 350. The cooling holes 220 may be manufactured in any suitable manner including casting or electrical discharge machining (EDM). Additionally, the cooling hole 220 may be formed in one step or multiple steps. For example, the interior portion 302 may be formed in a first step, and the trench 350 may be formed as an additional step. Additional manufacturing and construction techniques may be found, for example, in application Ser. No. 12/652,854 filed Nov. 25, 2009, the disclosure of which is hereby incorporated by reference in its entirety.

FIGS. 7-13 are depictions of cooling holes 600, 800, 900, 1000, 1100 in accordance with alternate embodiments that may be incorporated into the airfoil 200 of FIG. 2. In general, the cooling holes 600, 800, 900, 1000, 1100 may have a cross-sectional configuration relative to main stream gas flow similar to the cooling hole 220 depicted in FIG. 3. As such, the cooling holes 600, 800, 900, 1000, 1100 of FIGS. 7-13 generally include a trench formed by a concave wall extending in a downstream direction. The cooling holes 600, 800, 900, 1000, 1100 of FIGS. 7-13 will now be discussed in greater detail.

Figure 7:
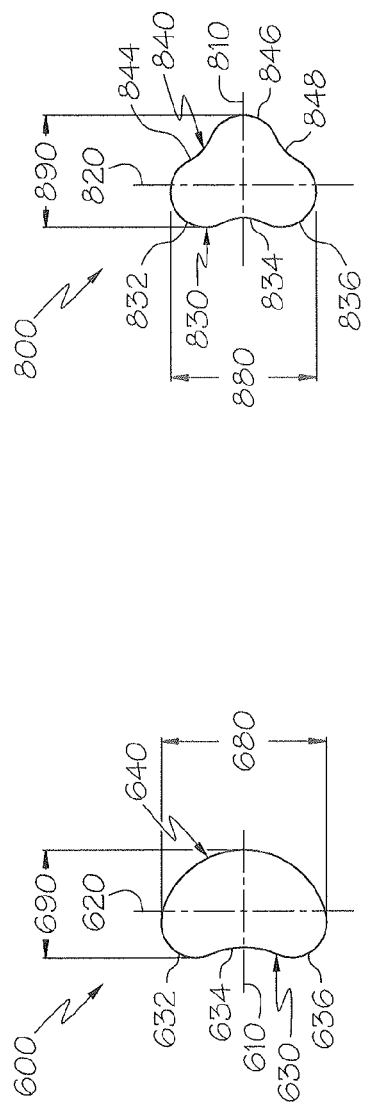
FIG. 7 is a cross-sectional view of a cooling hole through line 4-4 of FIG. 3 in accordance with an alternate exemplary embodiment.

FIG. 7 is a cross-sectional view of a downstream portion of a cooling hole 600 and generally corresponds to the view through line 4-4 of FIG. 3 in accordance with an alternate exemplary embodiment. In the exemplary embodiment of FIG. 7, the cooling hole 600 is bean-shaped. The cooling hole 600 may be considered to have a first axis 610 and a second axis 620, and the cooling hole 600 may be oriented in any suitable manner. In one exemplary embodiment, the cooling hole 600 is oriented such that the first axis 610 is parallel to the local streamlines of the combustion gases. In such an embodiment, the cooling hole 600 has a leading edge 630 and a trailing edge 640. The leading edge 630 generally has a convex portion 632, a concave portion 634, and a convex portion 636. In one exemplary embodiment, the convex portion 632 transitions directly into the concave portion 634, which transitions directly into the convex portion 636. The trailing edge 640 is generally convex. As such, the cooling hole 600 generally has no straight portions. The cooling hole 600 is generally symmetrical about the first axis 610 and asymmetrical about the second axis 620. As also shown in FIG. 7, the cooling hole may have a width 680 and a length 690. Although the cross-sectional shape of the cooling hole 600 has the shape shown in FIG. 7, the cross-sectional shape of the hole 600 may be different in areas further upstream (i.e., closer to the interior surface of the airfoil), including shapes such as round or oval.

Figure 8:
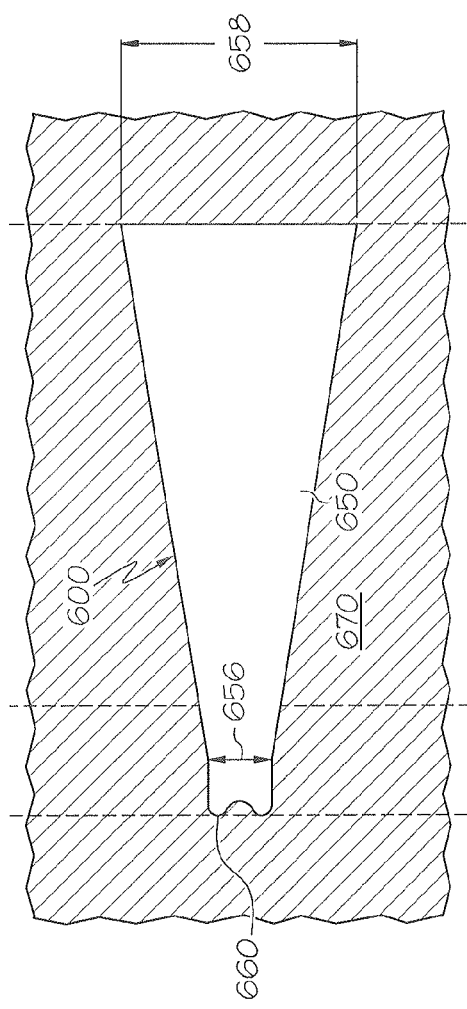
FIG. 8 is a top view of the cooling hole of FIG. 7 in accordance with an exemplary embodiment.

FIG. 8 is a top view of the cooling hole 600 of FIG. 7 at the surface 670 of an airfoil component in accordance with an exemplary embodiment. The cooling hole 600 includes a trench 650 at the surface 670 extending in a downstream direction. The leading edge 660 of the cooling hole 600 at the surface 670 is generally shaped similar to the leading edge 630 of the interior portion shown in FIG. 7. As such, the leading edge 660 includes a convex portion, a concave portion, and a convex portion. The trench 650 transitions from a first width 656 that generally corresponds to the cross-sectional width 680 (FIG. 7) of the cooling hole 600 to a second, maximum width 658 at the downstream end. In the depicted embodiment, the trench 650 transitions from the first width 656 to the second width 658 in a constant manner such that the trench 650 has a generally fan shape as viewed from a top view such as shown in FIG. 8.

Figure 9:
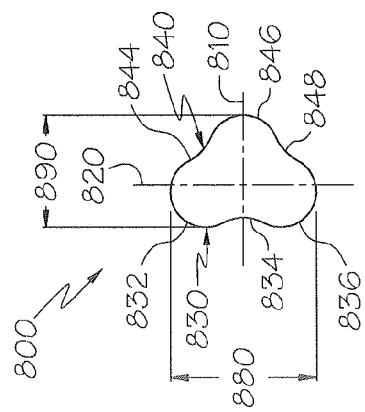
FIG. 9 is a cross-sectional view of a cooling hole through line 4-4 of FIG. 3 in accordance with an alternate exemplary embodiment.

FIG. 9 is a cross-sectional view of a downstream portion of a cooling hole 800 and generally corresponds to the view through line 4-4 of FIG. 3 in accordance with another alternate exemplary embodiment. The cooling hole 800 may be, for example, triad-shaped. The cooling hole 800 may be considered to have a first axis 810 and a second axis 820. The cooling hole 800 may be oriented in any suitable manner, and in one exemplary embodiment, the cooling hole 800 is oriented such that the first axis 810 is parallel to the local streamlines of the combustion gases. In such an embodiment, the cooling hole 800 has a leading edge 830 and a trailing edge 840. The leading edge 830 generally has a convex portion 832, a concave portion 834, and a convex portion 836. In one exemplary embodiment, the convex portion 832 transitions directly into the concave portion 834, which transitions directly into the convex portion 836. The trailing edge 840 generally has a concave portion 844, a convex portion 846, and a concave portion 848. In one exemplary embodiment, the concave portion 844 transitions directly into the convex portion 846, which transitions directly into the concave portion 848. As such, the cooling hole 800 generally has no straight portions and the concave portions 834, 844, 848 alternate with the convex portions 832, 836, 846. The cooling hole 800 is generally symmetrical about the first axis 810 and asymmetrical about the second axis 820. As also shown in FIG. 8, the cooling hole may have a width 880 and a length 890. Considering the shape of the leading edge 830, the cooling hole 800 generally has a top view (not shown) similar to that shown in FIG. 8. In other words, the top portion of the cooling hole 800 at the component surface has a leading edge 830 with the convex portion 832, the concave portion 834, and the convex portion 836 and a trench extending downstream at a length that is at least three times the length 890 of the cooling hole 800.

Figure 10:
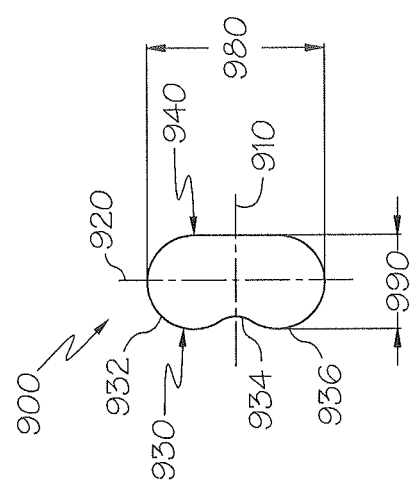
FIG. 10 is a cross-sectional view of a cooling hole through line 4-4 of FIG. 3 in accordance with an alternate exemplary embodiment.

FIG. 10 is a cross-sectional view of a downstream portion of a cooling hole 900 and generally corresponds to the view through line 4-4 of FIG. 3 in accordance with another alternate exemplary embodiment. The cooling hole 900 may be, for example, a reverse B-shape. The cooling hole 900 may be considered to have a first axis 910 and a second axis 920. The cooling hole 900 may be oriented in any suitable manner, and in one exemplary embodiment, the cooling hole 900 is oriented such that the first axis 910 is parallel to the local streamlines of the combustion gases. In such an embodiment, the cooling hole 900 has a leading edge 930 and a trailing edge 940. The leading edge 930 generally has a convex portion 932, a concave portion 934, and a convex portion 936. In one exemplary embodiment, the convex portion 932 transitions directly into the concave portion 934, which transitions directly into the convex portion 936. The trailing edge 940 is generally straight. The cooling hole 900 is generally symmetrical about the first axis 910 and asymmetrical about the second axis 920. As also shown in FIG. 10, the cooling hole 900 may have a width 980 and a length 990. Considering the shape of the leading edge 930, the cooling hole 900 generally has a top view (not shown) similar to that shown in FIG. 8. In other words, the top portion of the cooling hole 900 at the component surface has a leading edge 930 with the convex portion 932, the concave portion 934, and the convex portion 936 and a trench extending downstream at a length that is at least three times the length 990 of the cooling hole 900.

Figure 11:
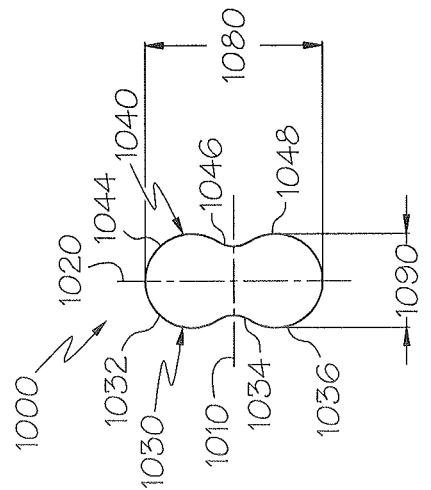
FIG. 11 is a cross-sectional view of a cooling hole through line 4-4 of FIG. 3 in accordance with an alternate exemplary embodiment.

FIG. 11 is a cross-sectional view of a downstream portion of a cooling hole 1000 and generally corresponds to the view through line 4-4 of FIG. 3 in accordance with another alternate exemplary embodiment. The cooling hole 1000 may be, for example, dumbbell-shaped. The cooling hole 1000 may be considered to have a first axis 1010 and a second axis 1020. The cooling hole 1000 may be oriented in any suitable manner, and in one exemplary embodiment, the cooling hole 1000 is oriented such that the first axis 1010 is parallel to the local streamlines of the combustion gases. In such an embodiment, the cooling hole 1000 has a leading edge 1030 and a trailing edge 1040. The leading edge 1030 generally has a convex portion 1032, a concave portion 1034, and a convex portion 1036. In one exemplary embodiment, the convex portion 1032 transitions directly into the concave portion 1034, which transitions directly into the convex portion 1036. The trailing edge 1040 generally has a convex portion 1044, a concave portion 1046, and a convex portion 1048. In one exemplary embodiment, the convex portion 1044 transitions directly into the concave portion 1046, which transitions directly into the convex portion 1048. As such, the cooling hole 600 generally has no straight portions. The cooling hole 1000 is generally symmetrical about the first axis 1010 and symmetrical about the second axis 1020. As also shown in FIG. 11, the cooling hole may have a width 1080 and a length 1090. Considering the shape of the leading edge 1030, the cooling hole 1000 generally has a top view (not shown) similar to that shown in FIG. 8. In other words, the top portion of the cooling hole 1000 at the component surface has a leading edge 1030 with the convex portion 1032, the concave portion 1034, and the convex portion 1036 and a trench extending downstream at a length that is at least three times the length 1090 of the cooling hole 1000.

Figure 12:
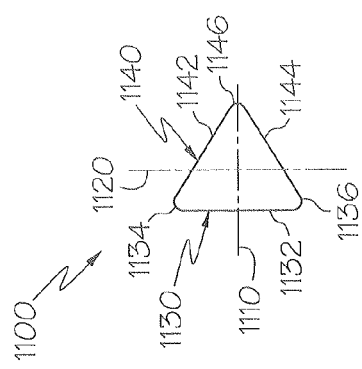
FIG. 12 is a cross-sectional view of a cooling hole through line 4-4 of FIG. 3 in accordance with an alternate exemplary embodiment.

FIG. 12 is a cross-sectional view of a downstream portion of a cooling hole 1100 and generally corresponds to the view through line 4-4 of FIG. 3 in accordance with another alternate exemplary embodiment. The cooling hole 1100 may be, for example, triangle-shaped. The cooling hole 1100 may be considered to have a first axis 1110 and a second axis 1120. The cooling hole 1100 may be oriented in any suitable manner, and in one exemplary embodiment, the cooling hole 1100 is oriented such that the first axis 1110 is parallel to the local streamlines of the combustion gases. In such an embodiment, the cooling hole 1100 has a leading edge 1130 and a trailing edge 1140. The leading edge 1130 is generally straight and forms one of the sides 1132 of the triangular shape. The trailing edge 1140 is formed by the other two sides 1142, 1144 of the triangular shape. The sides 1132, 1142, 1144 are generally straight and are joined at corners 1134, 1136, 1146, which may be formed by curves or straight edge angles. The cooling hole 1100 is generally symmetrical about the first axis 1110 and asymmetrical about the second axis 1120.

Figure 13:
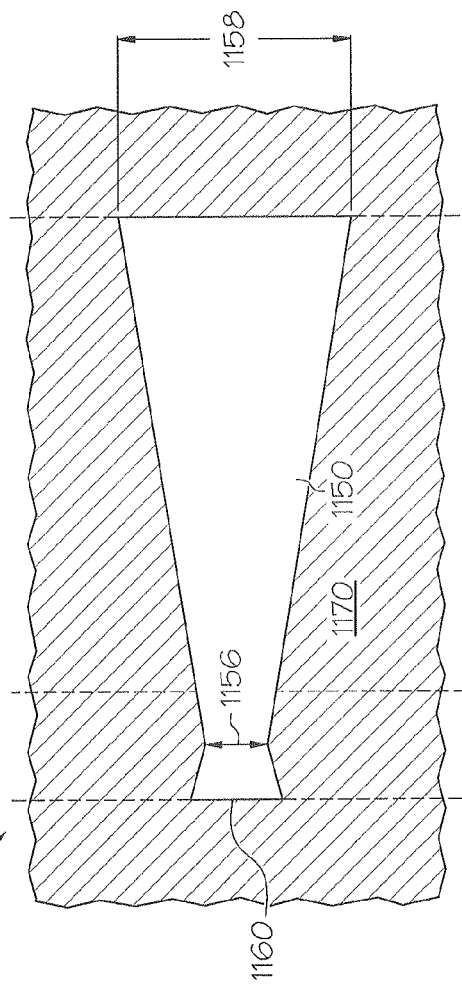
FIG. 13 is a top view of the cooling hole of FIG. 12 in accordance with an exemplary embodiment.

FIG. 13 is a top view of the cooling hole 1100 of FIG. 12 at the surface 1170 of an airfoil component in accordance with an exemplary embodiment. The cooling hole 1100 includes a trench 1150 at the surface 1170 extending in a downstream direction. The leading edge 1160 of the cooling hole 1100 at the surface 1170 is generally shaped similar to the leading edge 1130 of the interior portion shown in FIG. 12. The trench 1150 transitions from a first width 1156 that generally corresponds to the cross-sectional width of the cooling hole 1100 to a second, maximum width 1158 at the downstream end. In the depicted embodiment, the trench 1150 transitions from the first width 1156 to the second width 1158 in a constant manner such that the trench 1150 has a generally fan shape as viewed from a top view such as shown in FIG. 13.

In general, the cross-sectional shapes and trenches of the holes 220, 600, 800, 900, 1000, 1100 facilitate the distribution of the cooling air substantially completely over the outer surface of the airfoil. In particular, the cross-sectional shapes and trenches function as a diffuser to reduce the velocity and increase static pressure of the cooling airstreams exiting the holes and encourage cooling film development. The trenches additionally increase the lateral spread distribution of the exiting airflows, decrease peak velocities, and improve adiabatic effectiveness across a number of blowing ratios. These airstreams are more inclined to cling to the surface for improved cooling rather than separate from the surface. This produces an enhanced cooling effect at the surface. Consequently, exemplary embodiments promote the service life of the airfoil (e.g., airfoils 122, 124, 200) as a result of a more uniform cooling film at the external surfaces. Since the cooling air is minimally intrusive the drag offered by such a cooled airfoil will be lower.

Exemplary embodiments disclosed herein are generally applicable to air-cooled components, and particularly those that are to be protected from a thermally and chemically hostile environment. Notable examples of such components include the high and low pressure turbine nozzles and blades, shrouds, combustor liners and augmentor hardware of gas turbine engines. Additionally, the cooling holes discussed above may be incorporated into turbine components. The advantages are particularly applicable to gas turbine engine components that employ internal cooling to maintain the service temperature of the component at an acceptable level while operating in a thermally hostile environment. In other embodiments, the exemplary embodiments, including the trenches discussed above, may be incorporated into cooling holes of combustor components, including combustor liners.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine component, comprising:
    a body having an interior surface and an exterior surface;
    a cooling hole formed in the body and extending from the interior surface to the exterior surface; and
    a concave trench extending from the cooling hole at the exterior surface of the body in a downstream direction, wherein the cooling hole has a cross-sectional shape with a leading edge and a trailing edge, wherein the leading edge includes a first convex portion, a second convex portion, and a first concave portion, the first convex portion transitioning into the first concave portion, the first concave portion transitioning into the second convex portion, and wherein the trailing edge includes a second concave portion transitioning into a third convex portion, the third convex portion transitioning into a third concave portion.

2. The engine component of claim 1, wherein the concave trench has a continuously concave shape from an upstream end to a downstream end along a longitudinal axis in a downstream direction.

3. The engine component of claim 1, wherein the leading edge of the cooling hole is a first leading edge and the concave trench has a second leading edge coincident with the first leading edge.

4. The engine component of claim 1, wherein the leading edge of the cooling hole is a first leading edge having a first shape, and the concave trench has a second leading edge having a second shape, the first shape being similar to the second shape.

5. The engine component of claim 1, wherein the cooling hole has a first length and the concave trench extends in the downstream direction at a second length, the second length being at least three times the first length.

6. The engine component of claim 1, wherein the concave trench has a first width at a first position and a second width at a second position that is downstream of the first position, the second width being greater than the first width.

* * * * *